Sept. 16, 1952    H. B. R. BOOSMAN ET AL    2,611,078
TELEGRAPH TRANSMITTER WITH AMPLITUDE-MODULATION
Filed June 30, 1948
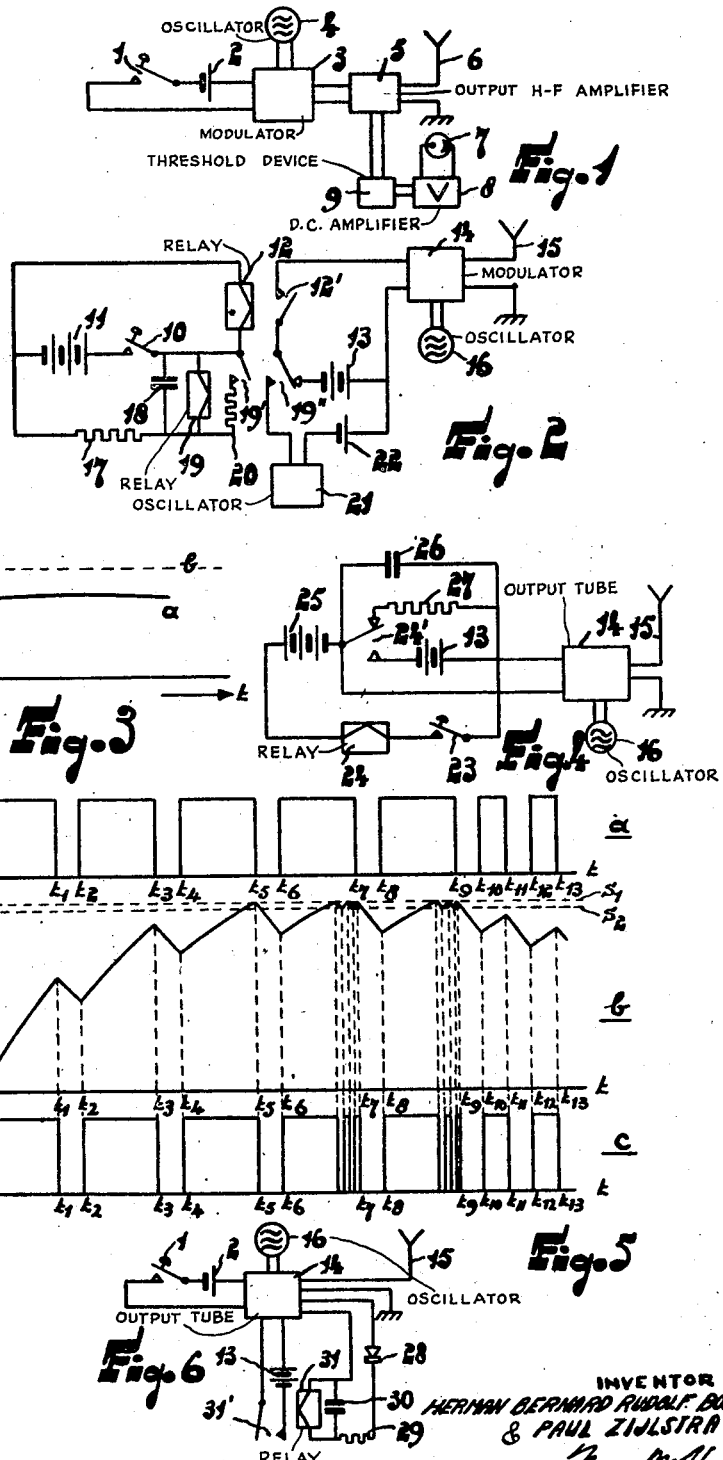

Patented Sept. 16, 1952

2,611,078

UNITED STATES PATENT OFFICE 2,611,078

TELEGRAPH TRANSMITTER WITH AMPLITUDE-MODULATION

Herman Bernard Rudolf Boosman and Paul Zijlstra, Eindhoven, Netherlands, assignors to Hartford National Bank and Trust Company, Hartford, Conn., as trustee Application June 30, 1948, Serial No. 36,184
In the Netherlands June 3, 1947

5 Claims. (Cl. 250—8)

The invention relates to a radio transmitter for transmitting a carrier oscillation modulated in amplitude by telegraphic signals, for example, Morse signals.

Such a telegraph transmitter with amplitude-modulation requires to be arranged so as to prevent detrimental overload of the transmitter even in the case of abnormal manipulation of the sending key, but thus in normal use transmission is not carried out with maximum transmitting power.

The invention has for its object to provide a form of telegraph transmitter in which transmission is effected with maximum power in normal use and abnormal operation conditions involve neither harmful overload nor interruption of operation.

According to the invention, for this purpose a measuring value is produced which varies with the temperature of an output valve of the transmitter and means are provided to limit the transmitter load for at least the period over which the said measuring value exceeds a definite limit value which corresponds to a temperature lower than the maximum permissible temperature of the said output valve.

The use of the invention permits of arranging the transmitter in such manner that in normal use, in which a normal ratio between signal and duration of interval (about 1:1) may be relied on, the transmitter is practically loaded to its maximum value. In the case of abnormal transmission signals, for example if a particularly large number of dashes is given with short intervals, or else if in view of the tuning of a second station, the sending key is depressed for 30 seconds or more, restriction of the transmitter load automatically occurs in due time, in order to avoid excessive temperature of the output valve or valves and hence the necessity of interrupting operation.

The measuring value required for automatic load restriction and corresponding to the temperature of the output valve of the transmitter may be ascertained directly with the use of a thermometer checking the temperature of the tube.

However, as an alternative the temperature may be measured indirectly by supplying a voltage proportional to the modulating or modulated voltage to an integrating network, of which the condenser (integration condenser), across which the integrated value occurs, is shunted by a discharge resistance. The condenser voltage thus constitutes a measuring value varying with the temperature of the output valve of the transmitter.

A method of bringing about the load restriction of the transmitter consists in increasing the negative control-grid bias voltage of the output valve(s) of the transmitter.

A further method, which is greatly preferred, consists in reducing the modulating voltage in the rhythm of a frequency of which one period is smaller than the duration of the shortest signal, which readily permits at the receiver end of avoiding spurious reproduction of the signals. The modulating voltage may, for example, be intermittently interrupted. A particular advantage of the latter method consists in that, in spite of the reduction in load of the transmitter the signal-noise ratio of the telegraph signals remains unchanged upon reception, so that in practice the range of the transmitter is not reduced.

In order that the invention may be more clearly understood and readily carried into effect, it will now be described more fully with reference to the accompanying drawings, elements known per se being shown on the figures in the form of blocks and corresponding elements being designated by like reference numerals.

Fig. 1 shows a telegraph transmitter according to the invention, the measuring value corresponding to the temperature of the output valve of the transmitter being ascertained directly.

Fig. 2 shows a telegraph transmitter according to the invention, a measuring value corresponding to the temperature of the output valve of the transmitter being ascertained indirectly with the use of an integrating network;

Fig. 3 shows some few diagrams to illustrate the operation of the telegraph transmitter shown in Fig. 2;

Fig. 4 shows a variant in the telegraph transmitter shown in Fig. 2;

Fig. 5 shows diagrams to illustrate the operation of the telegraph transmitter shown in Fig. 4;

Fig. 6 shows a telegraph transmitter according to the invention, a measuring value corresponding to the temperature of the output valve of the transmitter being ascertained indirectly by supplying the detected and modulated direct-current signals to an integrating network.

In the telegraph transmitter shown in Fig. 1 the modulating direct-current signals are fed from a sending key 1 and a battery 2 to a modulator 3, which is connected to a high-frequency oscillator 4 for the supply of the carrier wave.

Subsequent to amplification in a transmitter output amplifier 5 to the modulated oscillations are supplied to an aerial 6. The temperature of the output valve (valves) of the transmitter is ascertained with the use of a thermometrical device 7 and converted into an electrical measuring value. Thermometrical devices of this kind may be constituted, for example, by a radiation thermometer (bolometer or photo-cell) or a thermopile or other electric thermometer which indicates the temperature of the output valve of the transmitter. With forced cooled transmitting tubes the temperature of the cooling agent is a measure of the temperature of the tube, so that it may form the starting point.

In the form shown in Fig. 1 the thermometer voltage is amplified by a direct-current amplifier 8 and then fed to a threshold device 9. If the voltage supplied by the amplifier 8 exceeds a limit value determined by the threshold device 9 and corresponding to a temperature lower than the maximum permissible temperature of the output valve of the transmitter, an output voltage of the threshold device 9 occurs which is fed, as a control-voltage, to the grid of the output valve(s) of the transmitter in such manner that the dissipation is restricted.

In the embodiment shown in Fig. 2, 10 designates a sending key, which is connected in series with a battery 11 and a signalling relay 12. The signalling relay 12 comprises a make contact 12', included in the grid circuit of a modulator 14, which normally is cut off by a suitable bias voltage, is constituted by the output valve of the transmitter and is connected to a carrier-wave oscillator 16. The modulated oscillations are emitted by an aerial 15.

On closing of the sending key 10 the relay 12 is energized and the make contact 12' is closed. The cut-off bias voltage of the modulator 14 is thus rendered inoperative by the positive auxiliary voltage set up by a battery 13 in the grid circuit of the modulator valve.

In contrast with Fig. 1, Fig. 2 shows indirect temperature measurement, i. e. by supplying the modulating signals occurring across the series combination of the sending key 10 and the battery 11 to an integrating network comprising a resistance 17 and an integrating condenser 18. The voltage across the integrating condenser 18 controls a maximum relay 19 connected in parallel therewith, which on response brings about a restriction of the transmitter load in a manner to be described hereinafter.

The signals supplied to the integrating network 17, 18, 19 bring about a charge of the integrating condenser 18, which charge depends on the time constant of the charging circuit of the condenser 18, which is determined by the capacity of the latter, the resistance 17 and the resistance of the maximum relay 19. When the sending key 10 is open, the condenser 18 is discharged through the maximum relay 19. The discharge circuit connected in parallel therewith, which comprises the series-combination of the resistance 17 and the resistance of the signalling relay 12, is negligible in practice.

If the charging and discharging circuits of the condenser 18 are correctly proportioned, the voltage across the integrating condenser 18 constitutes a measuring value corresponding to the temperature of the output valve of the transmitter. In practice it is preferred to provide that during a signal the integration voltage increases more rapidly than the temperature of the output valve of the transmitter and this may be achieved in a simple manner by choosing the time constant of the charging circuit of the integrating condenser 18 to be smaller than the time constant for the increase in temperature of the loaded output valve of the transmitter. The discharge circuit of the integrating condenser 18 is preferably chosen to be such that its time constant approximately corresponds with the time constant for the decrease in temperature of the unloaded output valve of the transmitter.

In normal operation, when transmission takes place with maximum output and the output valve of the transmitter reaches a definite limit value corresponding to a temperature lower than the maximum permissible temperature, the voltage of the integrating condenser 18 will not be increased to the value of energisation of the maximum relay 19. In the case of abnormal manipulation of the sending key 10, for example, when the sending key remains closed for a long period, the temperature of the output valve of the transmitter will exceeed the said limit value and the energisation of the maximum relay 19 results in due time in such a restriction of the transmitter load that the maximum permissible temperature of the output valve of the transmitter is not exceeded.

In order to follow the temperature variation of the tube in the measuring circuit 17, 18, 19 in the case of load restriction of the output valve of the transmitter, the measuring circuit constants also require to be modified. For this purpose the maximum relay 19 of Fig. 2 comprises a make contact 19', which in its closed position connects a supplementary discharge resistance 20 in parallel with the integrating condenser 18.

The load restriction is achieved as follows: on the maximum relay 19 being energized, an alternating contact 19" of the maximum relay 19 connects an oscillator 21 which produces a sinusoidal voltage into the grid circuit of the output valve of the transmitter and also a battery 22, which supplies a supplementary positive bias voltage which is substituted for the higher positive bias voltage of the battery 13, which voltage is now cut off. The value of the battery and oscillator voltage is chosen to be such that, with continuous signal, the temperature of the output valve of the transmitter is kept below the maximum permissible value owing to the decrease of the modulating signal voltage, which decrease periodically occurs as a result of the sinusoidal voltage. In order to prevent signals from failing to appear due to the additional modulation, the frequency of the sinusoidal modulation must be chosen to be so high that one period thereof is small as compared with the duration of the shortest signal.

Instead of using a sinusoidal voltage for load restriction, use may be made of a triangular or rectangular voltage. Thus, for example, the modulating voltage may be intermittently interrupted with the use of an interruptor, for example, a multivibrator circuit.

Fig. 3 shows a diagram to illustrate the operation of the device shown in Fig. 2.

In the figure the variations of the voltage across the condenser 18 and the temperature of the output valve 14 of the transmitter are plotted against the time $t$, if the transmitter is loaded at the instant $t=0$ by closing the sending key 10. The temperature and voltage variations are shown by curves $a$ and $b$ respectively. At the instant $t=t_1$ the temperature of tube 14 reaches the predetermined limit value, whilst at the same instant the voltage across the condenser 18 exceeds the response voltage c of the maximum relay 19, which brings about a reduction in load of the output valve of the transmitter and thus keeps the temperature of tube 14 below the maximum value which is permissible for this tube.

Fig. 4 shows a telegraph transmitter according to the invention, in which the signalling relay also acts as an interruptor. A sending key 23 is connected in series with a signalling relay 24, a battery 25 and an integrating condenser 26. The signalling relay comprises an alternating contact 24' (shown in its position of rest), the lower contact point of which is connected to the control-grid of the output valve 14 of the transmitter, whereas the other contact point is connected, through a resistance 27, in series with the sending key 23, signalling relay 24 and battery 25. On the sending key 23 being closed, the signalling relay 24 is energized so that the integrating condenser 26 is charged through the resistance of the signalling relay. On the sending key being opened, the signalling relay becomes de-energized, which permits of the integrating condenser 26 being discharged through the resistance 27. The charge and discharge circuits being suitably proportioned, the voltage across the integrating condenser 26 constitutes a measuring value varying with the temperature of the output valve of the transmitter. If the condenser voltage exceeds a first threshold value which corresponds to the limit value which obtains for the temperature of the output valve of the transmitter, the relay 24 is de-energized with the result that the modulating voltage of the output valve 14 of the transmitter is interrupted. The integrating condenser thus becomes discharged through the parallel combination of the resistance 27 and the resistance of the signalling relay 24. If, however, the voltage of the condenser 26 falls below a second threshold value, the signalling relay is again energized, and so forth. Thus periodic interruption of the sending current is produced and the circuit constants being suitably chosen a normal signal-interval ratio of, for example, 1:1 is again attained in spite of the sending key being kept closed continuously, so that excessive load of the output valve of the transmitter is avoided.

The interruption frequency may be chosen to be so high that sending-current meters or indicators of standard type used at the receiver end do not give unsteady indication. If such a choice of the interruption frequency is not readily possible, for example from considerations of the available bandwidth, the interruption frequency may be temporarily increased, particularly in view of the tuning of a receiver co-operating with the transmitter, or else the dissipation in the output valve of the transmitter may be reduced to a permissible value by variation of the grid bias voltage.

Fig. 5 shows some few time diagrams to illustrate the operation of the telegraph transmitter shown in Fig. 4.

Fig. 5a illustrates a number of direct-current pulses which form the modulating voltage for the output valve of the transmitter. The signal-interval ratio of these direct-current pulses is deliberately chosen to be higher than 1, so that the temperature of the output valve of the transmitter will exceed the limit value obtaining therefor, which results in load restriction.

Fig. 5b illustrates the voltage across the integrating condenser 26 due to the signals shown in Fig. 5a. Both threshold values i. e. those values of the voltage across the condenser 26 at which the maximum relay 24 becomes energized and deenergized correspond to the two lines $S_1$ and $S_2$, which are drawn parallel to the time axis. With given circuit constants the interruption frequency is determined principally by the difference between the threshold values.

Fig. 5c shows the variation of the modulating voltage of the output valve of the transmitter 14. As may be seen from the figure the signals between the instants $0-t_1$, $t_2-t_3$, $t_4-t_5$ are transmitted in a normal manner, whereas the signals between $t_6-t_7$ and $t_8-t_9$ are intermittently interrupted.

In the telegraph transmitter shown in Fig. 6 the modulating direct-current signals from a sending key 1 and a battery 2 are fed to a transmitter output and modulator valve 14, which is also connected to the carrier-wave oscillator 16. Part of the output energy of the output valve 14 of the transmitter is detected by a rectifier 28 and then supplied to a temperature-indicating device comprising a resistance 29, a condenser 30 and a maximum relay 31. If the voltage across the condenser 30 exceeds a first threshold value which corresponds to a limit value obtaining for the temperature of the said output valve 14 of the transmitter, the relay 31 is energized, closes a make contact 31', which results in cutting off the output valve 14 of the transmitter with the use of a battery 13. The condenser 30 is thus adapted to discharge through the resistance of the maximum relay 31. If, however, the voltage across the condenser 30 falls below a second threshold value, the relay 31 is de-energized and so forth, so that intermittent interruption of the signals re-occurs.

What we claim is:

1. In a radio-telegraph transmitter constituted by a radio-frequency power amplifier provided with an electron discharge output tube, means coupled to said amplifier to adjust the average power consumed thereby, and a modulator actuated by a telegraph key to render said amplifier operative accordingly, the power consumed by said amplifier and the attendant temperature rise of said output tube depending on the time within a given period during which said key is closed: apparatus for preventing a temperature rise in said output tube beyond its maximum permissible value without interference to telegraph transmission, said apparatus comprising means to develop a control voltage whose amplitude varies in accordance with the temperature of said tube, and means responsive to amplitudes of control voltage exceeding that amplitude corresponding to said maximum permissible value and coupled to said power adjusting means to limit the average power consumed by said amplifier during telegraph modulation to a level at which the temperature of said tube is at a permissible value.

2. Apparatus as set forth in claim 1 wherein said means to limit the average power consumed by said amplifier includes means periodically to interrupt the operation of said amplifier at a relatively high rate with respect to the keying rate.

3. In a radio-telegraph transmitter constituted by a radio-frequency power amplifier provided with an electron discharge output tube, and a modulator actuated by telegraph signals to render said amplifier operative accordingly, the telegraph signals being produced by means including a telegraph key connected in series with a direct-voltage source, the power consumed by said amplifier and the attendant temperature rise of said output tube depending on the time within a given period during which said key is closed: apparatus for preventing a temperature rise in said output tube beyond its maximum permissible value without interference to transmission, said apparatus comprising an integrating network defined by a capacitor in series with a resistance, means to connect said network across said serially-connected key and voltage source, said network having a time constant at which the voltage developed across said capacitor has an amplitude which varies in accordance with the temperature of said tube, and means responsive to an amplitude of voltage developed across said capacitor exceeding that amplitude corresponding to said maximum permissible value to periodically interrupt the actuation of said modulator thereby to limit the average power consumed by said amplifier to a level at which the temperature of said tube is at a permissible value.

4. An arrangement, as set forth in claim 3, wherein said means responsive to an amplitude of voltage exceeding that corresponding to said maximum permissible value to periodically interrupt the actuation of said modulator includes a low-frequency oscillation generator, an electromagnetic relay connected across said capacitor, said relay being energized when the amplitude of voltage developed across said capacitor exceeds the amplitude corresponding to said maximum permissible value, said relay being arranged to connect said generator to the input of said modulator to impose the low-frequency oscillations as a modulation component on said telegraph signals whereby the actuation of said modulator is periodically interrupted at a rate corresponding to the frequency of said oscillations.

5. An arrangement, as set forth in claim 4, further including a discharge resistance, and means to connect said discharge resistance across said capacitor upon said being energized.

HERMAN BERNARD RUDOLF BOOSMAN.
PAUL ZIJLSTRA.

REFERENCES CITED

The following references are of record in the file of this patent:

UNITED STATES PATENTS

| Number | Name | Date |
| --- | --- | --- |
| 1,873,837 | Gebhard | Aug. 23, 1932 |
| 1,970,411 | Andrews | Aug. 14, 1934 |
| 2,115,559 | Odartchenko | Apr. 26, 1938 |
| 2,166,685 | Henderson | July 18, 1939 |
| 2,422,766 | Alexanderson | June 24, 1947 |